US008561914B2

(12) United States Patent  (10) Patent No.: US 8,561,914 B2
Jung  (45) Date of Patent: Oct. 22, 2013

(54) TEMPERATURE-RESPONSIVE FLUID FLOW CONTROL APPARATUS

(75) Inventor: Jaeyoung Jung, Seoul (KR)

(73) Assignee: Sudo Premium Engineering Co., Ltd., Seoul (KR)

( * ) Notice: Subject to any disclaimer, the term of this patent is extended or adjusted under 35 U.S.C. 154(b) by 180 days.

(21) Appl. No.: 13/139,088

(22) PCT Filed: Dec. 9, 2009

(86) PCT No.: PCT/KR2009/007351
§ 371 (c)(1),
(2), (4) Date: Jun. 10, 2011

(87) PCT Pub. No.: WO2010/068031
PCT Pub. Date: Jun. 17, 2010

(65) Prior Publication Data
US 2011/0240144 A1  Oct. 6, 2011

(30) Foreign Application Priority Data

Dec. 10, 2008  (KR) .................. 10-2008-0125055
Feb. 4, 2009  (KR) .................. 10-2009-0008875
Nov. 18, 2009  (KR) .................. 10-2009-0111530

(51) Int. Cl.
G05D 23/12  (2006.01)
(52) U.S. Cl.
USPC .................. 236/99 R; 137/62; 137/59; 251/28
(58) Field of Classification Search
USPC .................... 137/62, 59, 468; 251/28, 25, 50; 236/99 R
See application file for complete search history.

(56) References Cited

U.S. PATENT DOCUMENTS 3,642,015 A * 2/1972 Walters ........................ 137/59
4,320,872 A * 3/1982 Frederick ..................... 236/80 A
4,763,682 A * 8/1988 Gardner et al. ................ 137/62
(Continued)

FOREIGN PATENT DOCUMENTS

JP  S52-043725  3/1977
JP  10281320  10/1998
(Continued)

OTHER PUBLICATIONS

Office Action dated Apr. 28, 2013 issued in corresponding Chinese application No. 200980149724.X.
(Continued)

Primary Examiner — John Rivell
Assistant Examiner — Umashankar Venkatesan
(74) Attorney, Agent, or Firm — Bacon & Thomas, PLLC

(57) ABSTRACT

The temperature-responsive fluid flow control apparatus of the present invention comprises: a housing installed between the inlet and the outlet of a fluid pipe in which a fluid flows; a valve block installed inside the housing to allow inflow of the flowing fluid in the housing and to discharge a portion of the flowing fluid to the outside according to the change in the internal pressure; and a temperature-responsive device for generating a pressure difference in the valve block according to the temperature change of the temperature-responsive fluid filled therein. The temperature-responsive fluid flow control apparatus prevents the fluid flowing pipe from freezing by discharging a portion of the fluid flowing in the housing to the outside, when the temperature of the temperature-responsive fluid reaches a preset temperature as the external temperature drops.

24 Claims, 17 Drawing Sheets

(56) References Cited

U.S. PATENT DOCUMENTS

| | | | |
|---|---|---|---|
| 4,815,491 A * | 3/1989 | Prikle | 137/62 |
| 5,692,535 A * | 12/1997 | Walters | 137/62 |
| 6,805,154 B1 * | 10/2004 | Dickey et al. | 137/360 |
| 2008/0196773 A1 * | 8/2008 | Franconi | 137/492.5 |
| 2009/0020168 A1 * | 1/2009 | Franconi | 137/468 |

FOREIGN PATENT DOCUMENTS

| | | |
|---|---|---|
| JP | 11148576 | 6/1999 |
| JP | 2002004348 | 1/2002 |
| KR | 1019980010218 | 4/1998 |
| KR | 201080060074 | 11/1998 |
| KR | 1020010100106 | 11/2001 |
| KR | 2019980025848 | 11/2001 |
| KR | 100499258 | 6/2005 |
| KR | 100716544 | 5/2007 |
| KR | 100849915 | 7/2008 |

OTHER PUBLICATIONS

Office Action dated Apr. 2, 2013 issued in corresponding Japanese application No. 2011-540604 (w/English summary thereof).

* cited by examiner

TEMPERATURE-RESPONSIVE FLUID FLOW CONTROL APPARATUS

TECHNICAL FIELD

The present invention relates to an apparatus for controlling a flow of temperature-responsive fluid, and more particularly, to an apparatus for controlling a flow of temperature-responsive fluid which can discharge a small amount of fluid filled in a fluid pipe when a temperature of a temperature-responsive fluid in a temperature-responsive device reaches a preset temperature, thereby preventing the fluid pipe from freezing.

BACKGROUND OF THE INVENTION

In general, water in a water pipe as a representative fluid tube through which a fluid flow freezes when an outside temperature markedly drops as in the winter time. If water in the water pipe freezes in this way, as the volume of the water in the water pipe increases, cracks are likely to be formed in the water pipe. Thus, various apparatuses and methods have been used to prevent the occurrence of such cracks.

Most apparatuses and methods for preventing a fluid pipe from rupturing due to freezing of a fluid are directed for sensing a temperature in the fluid pipe and supplying power from an outside, for example, to a heater installed in the fluid pipe to prevent the fluid pipe from freezing. However, such apparatuses and methods have complicated constructions and power consumption increases, thereby requiring a lot of maintenance and repair costs.

DISCLOSURE

Technical Problem

It is, therefore, an object of the present invention to provide an apparatus for controlling a flow of temperature-responsive fluid which can discharge a portion of a fluid to an outside of a fluid pipe without power supply from the outside when a temperature of a temperature-responsive fluid in a temperature-responsive device installed in the fluid pipe reaches a preset temperature, thereby preventing the fluid pipe from rupturing due to freezing of the fluid.

Technical Solution

In accordance with an aspect of the present invention, there is provided an apparatus for controlling a flow of temperature-responsive fluid, which includes: a housing installed between an inlet and an outlet of a fluid pipe in which a flowing fluid flows; a valve block installed in the housing to allow inflow of the flowing fluid in the housing and to discharge a portion of the flowing fluid to an outside according to a change in an internal pressure; and a temperature-responsive device for generating a pressure difference in the valve block according to a change in a temperature of a temperature-responsive fluid filled therein.

Advantageous Effects

According to the present invention, a temperature of a temperature-responsive fluid filled in a temperature-responsive device reaches a preset temperature as an outside temperature drops, a small amount of a fluid in a housing is discharged to an outside, thereby preventing a fluid pipe from rupturing due to freezing of the fluid.

BEST MODE FOR THE INVENTION

Hereinafter, embodiments of the present invention will be described in detail with reference to the accompanying drawings so that they can be readily implemented by those skilled in the art, and it is, however, noted that it is just illustrative not limited thereto.

Figure 1:
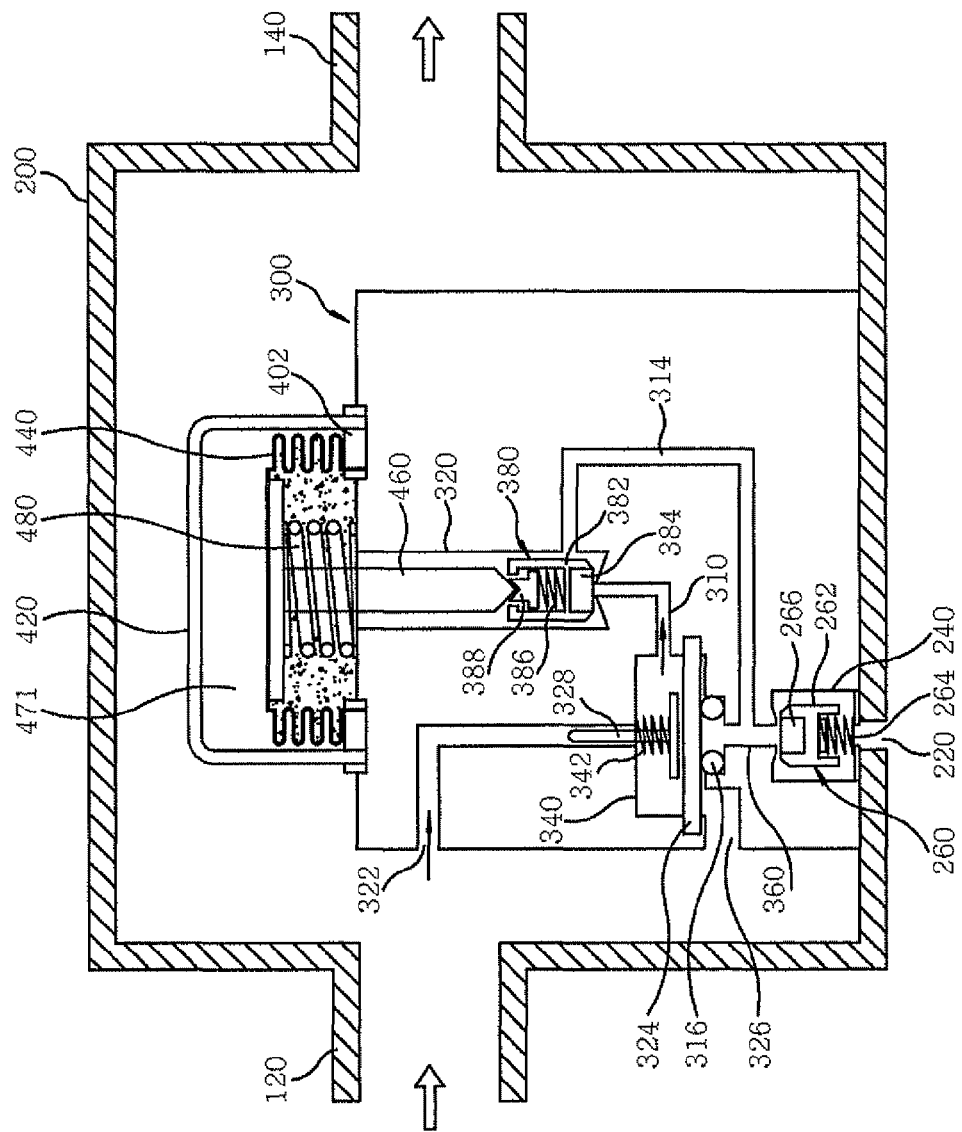
FIG. 1 is a schematic view illustrating an apparatus for controlling a flow of temperature-responsive fluid in accordance with a first embodiment of the present invention.
Figure 2:
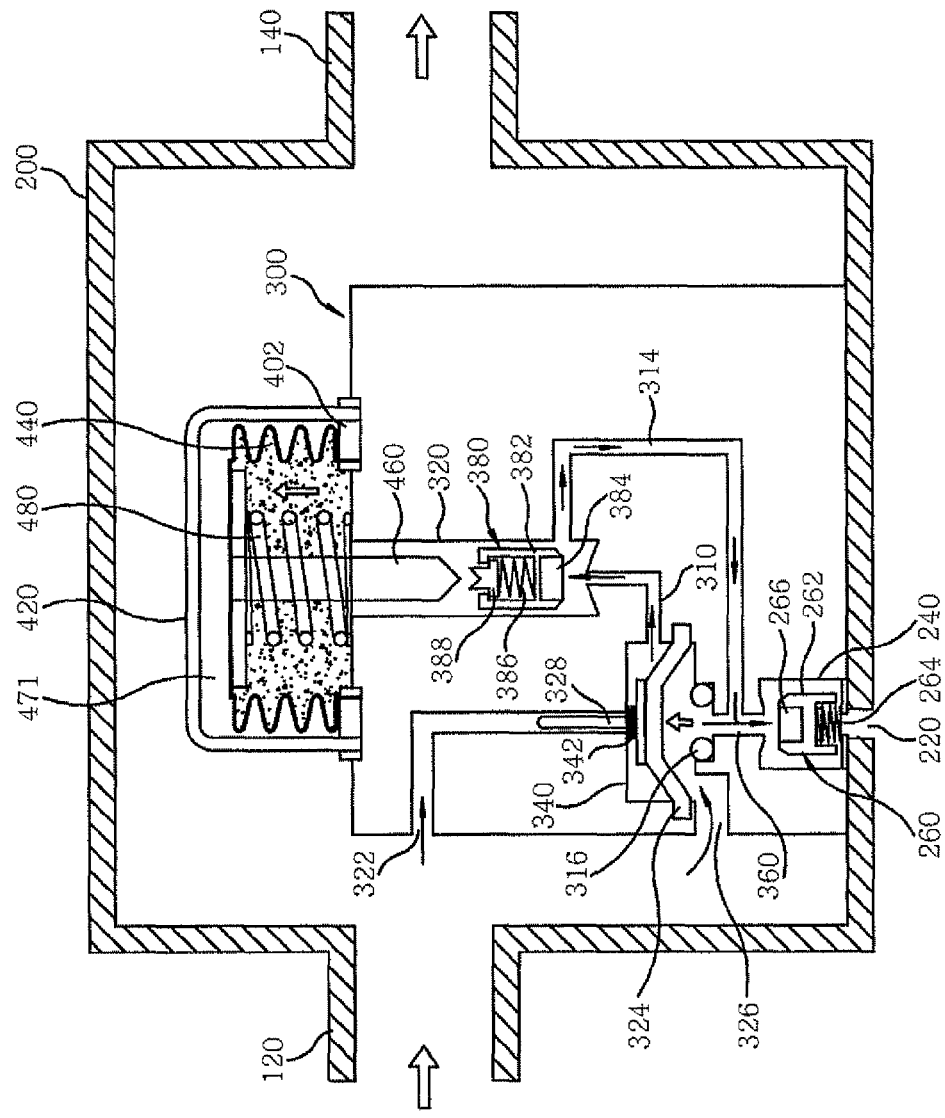
FIG. 2 is a view illustrating a state in which a temperature-responsive device is expanded when a temperature of a temperature-responsive fluid reaches a preset temperature in the apparatus for controlling a flow of temperature-responsive fluid shown in FIG. 1.

FIG. 1 is a schematic view illustrating the construction of an apparatus for controlling a flow of temperature-responsive fluid in accordance with a first embodiment of the present invention, and FIG. 2 is a view illustrating a state in which a temperature-responsive device is expanded when a temperature of a temperature-responsive fluid reaches a preset temperature in the apparatus for controlling a flow of temperature-responsive fluid shown in FIG. 1.

As shown in FIG. 1, an apparatus for controlling a flow of temperature-responsive fluid in accordance with a first embodiment of the present invention includes a housing 200, a value block 300, and a temperature-responsive device. The housing 200 is defined with an opening 220 to partially communicate with an outside, and is installed between an inlet 120 and an outlet 140 of a fluid pipe through which a fluid (hereinafter, referred to as a "flowing fluid") flows. The valve block 300 allows inflow of the flowing fluid in the housing 200, and is installed in the housing 200 to communicate with the opening 220 of the housing 200 through a fluid discharge chamber 240 so as to discharge a small amount of the flowing fluid to the outside according to a change in an internal pressure. The temperature-responsive device functions to induce a pressure difference in the valve block 300 depending on a temperature change in a temperature-responsive fluid 471. In the embodiment of the present invention, if a temperature of the temperature-responsive fluid 471 reaches a preset temperature at which the flowing fluid in the housing 200 can be discharged to the outside, a pressure difference is induced in the valve block 300, and the flowing fluid in the valve block 300 is discharged to the outside through the fluid discharge chamber 240 which communicates with the opening 220 of the housing 200. Here, the term "preset temperature" means a temperature before the flowing fluid in the housing 200 freezes. In the present invention, every time when the temperature of the temperature-responsive fluid 471 becomes the same with the preset temperature as an outside temperature drops, a small amount of the flowing fluid in the fluid pipe so that the fluid pipe is prevented from rupturing due to freezing of the flowing fluid.

The temperature-responsive device includes the value block 300 and a temperature-responsive unit 420 with a cap-like shape. The valve block 300 has defined therein a valve chamber 340 and a reaction chamber 320 which communicate with each other. The temperature-responsive unit 420 is filled with the temperature-responsive fluid 471, and is installed on the valve block 300 by a holder 402. The reaction chamber 320 communicates with the temperature-responsive unit 420. A bellows 440 is installed in the temperature-responsive unit 420 to contract and swell by condensation and expansion of the temperature-responsive fluid 471. It is preferred that the temperature of the temperature-responsive fluid 471 filled in the temperature-responsive unit 420 always be lower than the temperature of the flowing fluid in the housing 200. A piston member 460 is disposed in the bellows 440 to be raised and lowered by the contraction and swell of the bellows 440, and a spring 480 is wound around the outer surface of the piston member 460 to bias the piston member 460 in a downward direction.

The piston member 460 of the temperature-responsive unit 420 is raised and lowered through the reaction chamber 320 of the valve block 300. The reaction chamber 320 communicates with the valve chamber 340 via a first fluid path 310, the valve chamber 340 communicates with the fluid discharge chamber 240 via a discharge pipe 360, and a second fluid path 314 is connected between the reaction chamber 320 and the discharge pipe 360.

The valve chamber 340 has an upper inlet passage 322 in which a piston valve 328 is disposed and through which the flowing fluid in the housing 200 is introduced into the valve chamber 340, a rubber pad valve 324 disposed to cover the discharge pipe 360, and a lower inlet passage 326 defined to communicate with the discharge pipe 360 when the rubber pad valve 324 is opened. The unexplained reference numeral 316 designates a seal ring which is disposed under the rubber pad valve 324. It is preferred that the piston valve 328 always be biased downward by a spring 342. The rubber pad valve 324 needed to be pressed by the piston valve 328 with a prescribed pressure, for example, of 1-3 $kgf/m^2$. If the rubber pad valve 324 is pressed with a pressure less than the prescribed pressure of, for example, 0.5 $kgf/m^2$, the piston valve 328 may be raised, and the flowing fluid is likely to leak. Therefore, in order to prevent the occurrence of this phenomenon, the rubber pad valve 324 needs to be pressed with the prescribed pressure.

A first valve body 380 is disposed in the reaction chamber 320 to be raised and lowered as the piston member 460 is raised and lowered, to thereby open and close the first fluid path 310. The first valve body 380 includes a hollow member 382, an elastic rubber member 384 inserted through the lower end of the hollow member 382, and a spring 386 and a contact member 388 which are sequentially inserted through the upper end of the hollow member 382. The contact member 388 is elastically brought into contact with the lower end of the piston member 460. The rubber member 384 is used to improve the water-tightness of the first fluid path 310.

If the temperature-responsive fluid 471 in the temperature-responsive unit 420 is excessively expanded, the piston member 460 is lowered by the pressure of the expanded temperature-responsive fluid 471, and a phenomenon is likely to occur in which the rubber member 384 below the first valve body 380 is severely pressed. Therefore, due to breakage of the rubber member 384, water-tightness may deteriorate, and a discharge timing of the flowing fluid may be changed by a degree to which the rubber member 384 is excessively pressed. In the present invention, even when the piston member 460 presses the first valve body 380 with a pressure greater than required due to the excessive expansion of the temperature-responsive fluid 471, the spring 386 can absorb an excessive pressure and prevent the rubber member 384 and the first valve body 380 from being damaged.

A second valve body 260 is disposed in the fluid discharge chamber 240 to open and close the discharge pipe 360. The second valve body 260 includes a hollow member 262, a spring 264 having one end which is inserted into the lower end of the hollow member 262 and the other end which is attached to the housing 200 around the opening 220, to bias the hollow member 262 upward, and an elastic rubber member 266 which is inserted into the upper end of the hollow member 262. The rubber member 266 is also used to improve the water-tightness of the discharge pipe 360.

The temperature-responsive unit 420 is filled with a gas as the temperature-responsive fluid 471. The gas may include a Freon-based or non-Freon-based refrigerant gas which is generally used in a refrigerator or the like. If the gas condenses as an outside temperature drops, an extra space is created in the temperature-responsive unit 420. Then, the piston member 460 is raised by the spring 480 wound around the piston member 460. As a result, the bellows 440 swells accordingly. However, conversely, if the gas expands as an outside temperature rises, the piston member 460 is lowered, and the bellows 440 contracts. In addition to the gas, other temperature-responsive fluids such as, for example, acetone, alcohol, ethanol and methanol may be filled in the temperature-responsive unit 420 so long as the other temperature-responsive fluids have properties to expand when a temperature rises and condense when a temperature drops. In the apparatus for controlling a flow of temperature-responsive fluid of the present invention as mentioned above, if the temperature of the temperature-responsive fluid 471 filled in the temperature-responsive unit 420 reaches the preset temperature and the temperature-responsive fluid 471 condenses, as shown in FIG. 2, the piston member 460 is raised by the elasticity of the spring 480, and the bellows 440 swells. The first valve body 380, which has closed the first fluid path 310, is raised in the reaction chamber 320, and the first fluid path 310 is then opened. Then, the flowing fluid, which has been introduced through the upper inlet passage 322 into the valve chamber 340 and has been filled in the valve chamber 340 and the first fluid path 310, starts to be introduced into the reaction chamber 320.

However, because the piston valve 328 is disposed in the upper inlet passage 322, an amount of the flowing fluid introduced into the valve chamber 340 through the upper inlet passage 322 is considerably smaller than an amount of the flowing fluid introduced into the reaction chamber 320 through the first fluid path 310 from the valve chamber 340. Accordingly, the fluid pressure of the valve chamber 340, that is, the fluid pressure on the rubber pad valve 324 is lowered. Meanwhile, underneath the rubber pad valve 324, since a fluid pressure is applied to the rubber pad valve 324 by the flowing fluid which has been introduced through the lower inlet passage 326 defined under the rubber pad valve 324, a pressure difference is induced between upper and lower sides of the rubber pad valve 324. As a consequence, the rubber pad valve 324 is raised as shown in FIG. 2, and the lower inlet passage 326 and the discharge pipe 360 communicate with each other. By this fact, as the flowing fluid in the housing 200 is introduced into the discharge pipe 360, lowers the second valve body 260 disposed in the fluid discharge chamber 240, and opens the discharge pipe 360, the flowing fluid is discharged through the opening 220. As a result, the temperature of the flowing fluid in the fluid pipe can always be maintained over the preset temperature, whereby it is possible to prevent the fluid pipe from rupturing due to freezing of the flowing fluid.

Meanwhile, as the rubber pad valve 324 is raised, the piston valve 328 disposed in the upper inlet passage 322 is pushed upward to close the upper inlet passage 322. Further, as the first valve body 380 is gradually raised and the second fluid path 314 is opened, the flowing fluid introduced into the reaction chamber 320 from the valve chamber 340 flows into the discharge pipe 360 through the second fluid path 314.

Assuming that the fluid pipe is regarded as a water pipe, because a water pressure of a water pipe generally has a value of about 2-3 kgf/cm$^2$, a flow rate when the flowing fluid, that is, water is discharged to the outside becomes very fast. Therefore, since all the flowing fluid flowing into the discharge pipe 360 through the second fluid path 314 is also discharged when discharging, according to Bernoulli's theorem, the insides of the valve chamber 340 with the closed upper inlet passage 322, the reaction chamber 320 and the second fluid path 314 are always maintained free of the flowing fluid.

If, however, the temperature of the temperature-responsive fluid 471 in the temperature-responsive unit 420 is equal to or lower than the preset temperature, a small amount of the flowing fluid in the fluid pipe is discharged through the opening 220 of the housing 200 for a short time. If 100% of a predetermined discharge amount is not discharged in an initial discharge stage, the flowing fluid may freeze while being discharged to close the opening 220. Thus, in an effort to minimize an amount of the flowing fluid to be discharged, it is preferable to prevent the flowing fluid from freezing and shorten an interval between a discharge start time and a discharge stop time, that is, to smoothly start and stop the discharge of the flowing fluid. This can be achieved in the first embodiment of the present invention through the cooperation of the first valve body 380, which has been pressed by the piston member 460 in the reaction chamber 320, and the second valve body 260 of the fluid discharge chamber 240. That is to say, because the contact member 388 of the first valve body 380 is pressed by the piston member 460 while being elastically supported by the spring 386, the piston member 460 can be quickly raised and discharge of the flowing fluid can be smoothly started. Moreover, as the second valve body 260 is also biased upward by the spring 264, the discharge pipe 360 can be quickly closed and the discharge of the flowing fluid can be smoothly stopped.

Figure 3:
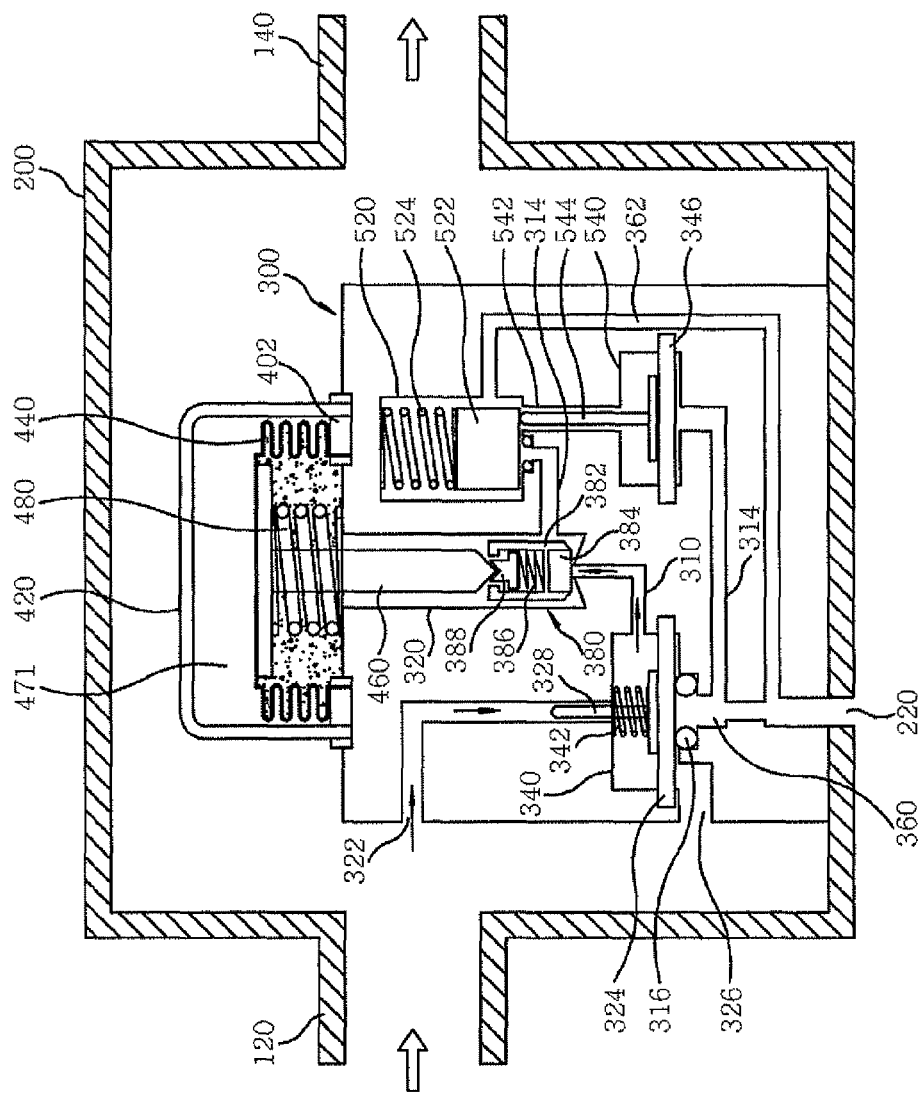
FIG. 3 is a schematic view illustrating an apparatus for controlling a flow of temperature-responsive fluid in accordance with a second embodiment of the present invention.
Figure 4:
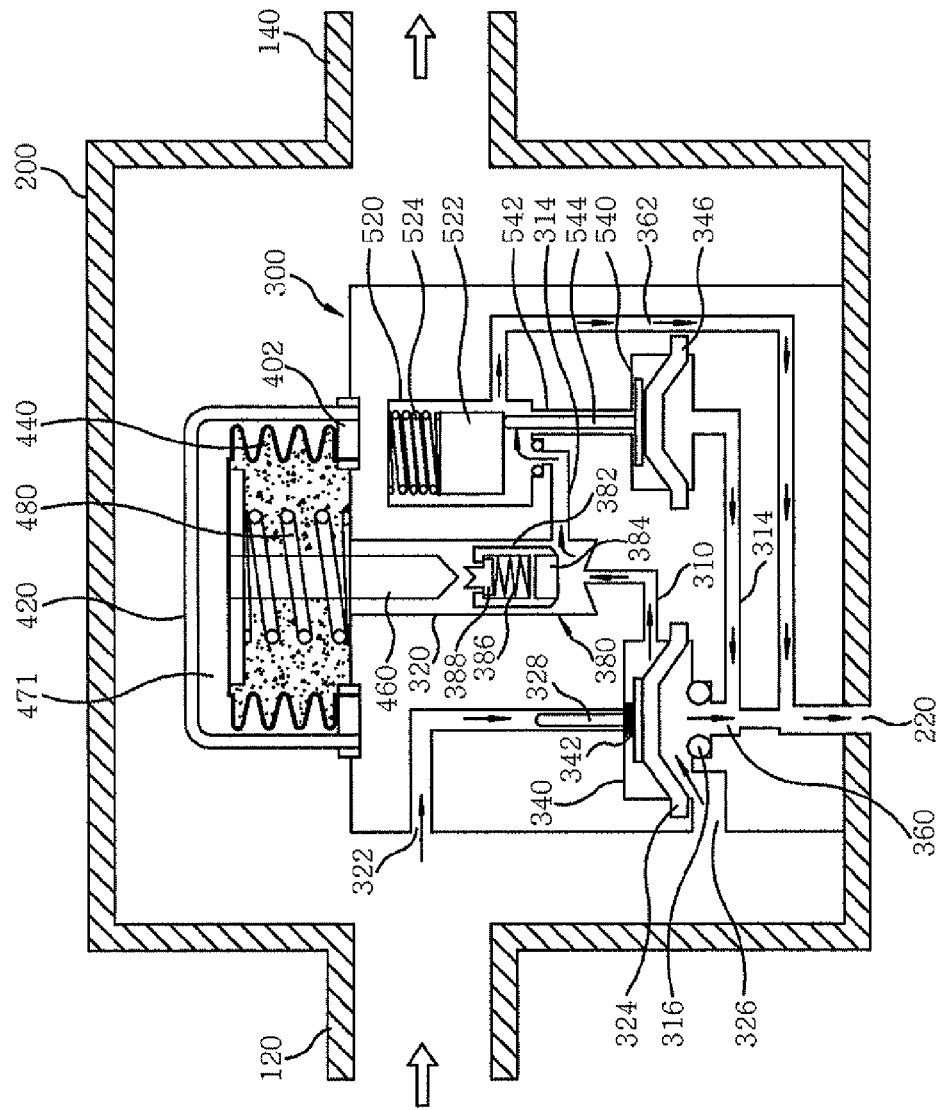
FIG. 4 is a view illustrating a state in which a temperature-responsive device is expanded when a temperature of a temperature-responsive fluid reaches a preset temperature in the apparatus for controlling a flow of temperature-responsive fluid shown in FIG. 3.

FIG. 3 is a schematic view illustrating an apparatus for controlling a flow of temperature-responsive fluid in accordance with a second embodiment of the present invention, and FIG. 4 is a view illustrating a state in which a temperature-responsive device is expanded when a temperature of a temperature-responsive fluid reaches a preset temperature in the apparatus for controlling a flow of temperature-responsive fluid of FIG. 3.

In an apparatus for controlling a flow of temperature-responsive fluid in accordance with a second embodiment of the present invention shown in FIGS. 3 and 4, a fluid discharge amount adjustor is added instead of the fluid discharge chamber of the first embodiment shown in FIGS. 1 and 2 to adjust a fluid discharge amount when initially discharging the flowing fluid. Therefore, the same reference numerals will be used to refer to the same components as those shown in FIGS. 1 and 2, and detailed descriptions thereof will be omitted herein.

In the second embodiment of the present invention, the fluid discharge amount adjustor is installed in the second fluid path 314 as in FIGS. 1 and 2. The fluid discharge amount adjustor includes a fluid storage chamber 520 and a second valve chamber 540 which communicates with the fluid storage chamber 520. In the present embodiment, the discharge pipe 360 has a center portion which is formed like an orifice tube. The upper end of the discharge pipe 360 communicates with the second valve chamber 540, and the lower end of the discharge pipe 360 communicates with the fluid storage chamber 520.

The fluid storage chamber 520 includes a valve member 522 installed to open and close the second fluid path 314, and a spring 524 disposed to bias the valve member 522 downward. When the valve member 522 is raised, the flowing fluid in the reaction chamber 520 is introduced into the fluid storage chamber 520 through the second fluid path 314.

A third fluid path 362 communicates with the discharge pipe 360 positioned downward, and is connected to the fluid storage chamber 520 at a predetermined height. When the valve member 522 is raised by the predetermined height or over, the flowing fluid introduced into the fluid storage chamber 520 is discharged via the third fluid path 362 through the discharge pipe 360 positioned downward.

The second valve chamber 540 is structured in a manner similar to the valve chamber 340. A piston valve 544 is disposed in a communication path 542 which communicates with the fluid storage chamber 520 to allow inflow of the flowing fluid introduced into the fluid storage chamber 520. The second valve chamber 540 includes a rubber pad valve 346 installed to cover the second fluid path 314. However, when the rubber pad valve 346 is opened, a negative pressure is induced in the second valve chamber 540 due to the flow rate of the flowing fluid which is discharged through the discharge pipe 360, and a portion of the flowing fluid is sucked into the second valve chamber 540 through the second fluid path 314. Thereafter, as the piston valve 544 is lowered by the spring 524, the rubber pad valve 346 is closed.

Figure 5:
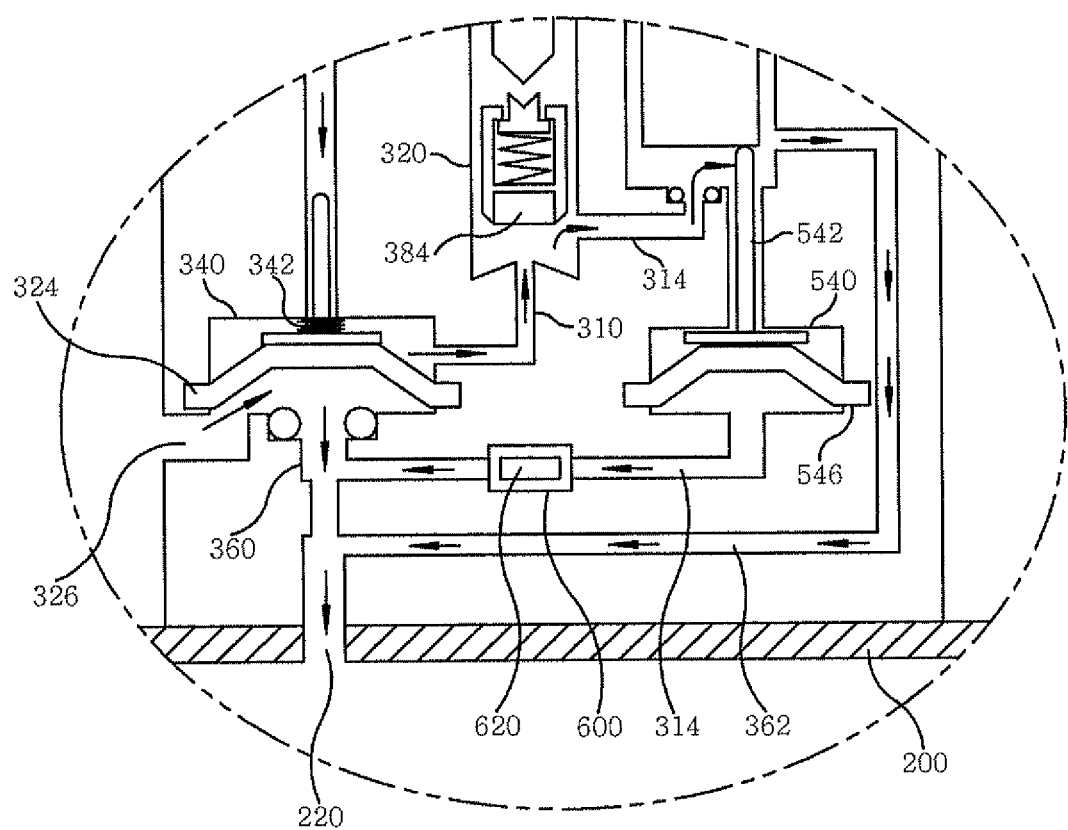
FIG. 5 is an enlarged view illustrating a damping chamber defined in a second fluid path between a discharge pipe and a fluid storage chamber in the apparatus for controlling a flow of temperature-responsive fluid shown in FIG. 3.

In this process, if the flow rate of the flowing fluid is fast, since the amount of the flowing fluid introduced into the discharge pipe 360 through the lower inlet passage 326 is not sufficient, the temperature of the flowing fluid in the housing 200 is likely to gradually decrease, which results in freezing. In order to prevent this phenomenon from occurring, as shown in FIG. 5, it is preferred that a damping chamber 600 having a resistance shaft 620 is disposed in the second fluid path 314 between the discharge pipe 360 positioned upward and the second valve chamber 540 to impede the discharge of the flowing fluid.

In the apparatus for controlling a flow of temperature-responsive fluid in accordance with the embodiments of the present invention, by repeating the above operations, the flowing fluid can always flow through the fluid pipe. Therefore, even when an outside temperature drops, it is possible to prevent the flowing fluid in the fluid pipe from freezing, without power supply from an outside, whereby the fluid pipe is prevented from rupturing due to the freezing of the flowing fluid.

Figure 6:
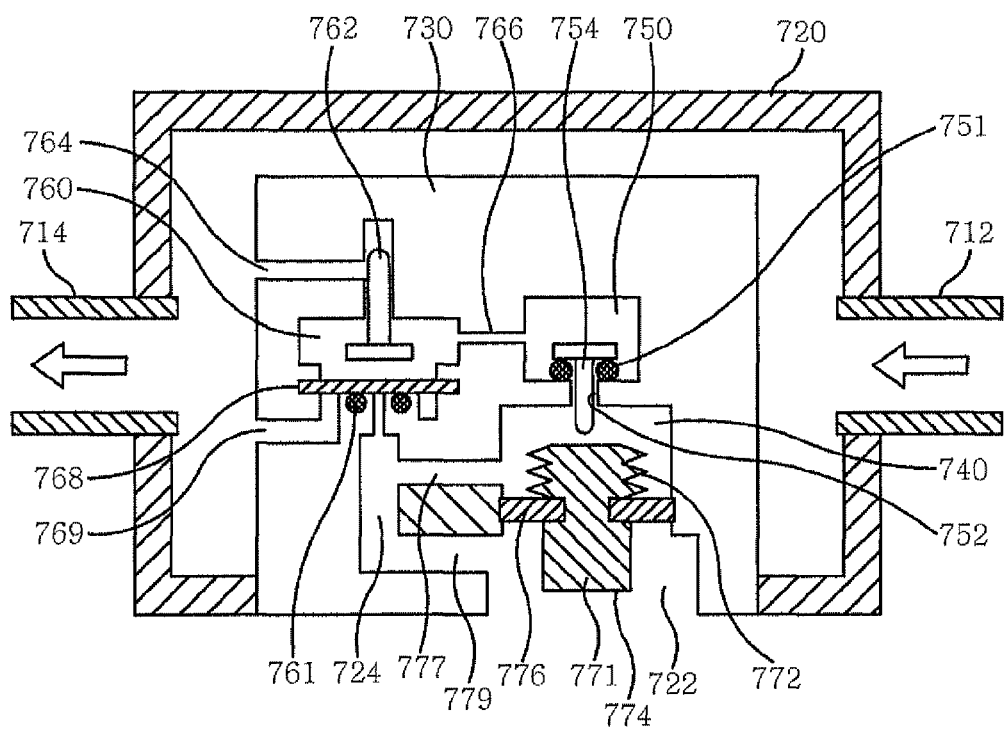
FIG. 6 is a schematic view illustrating an apparatus for controlling a flow of temperature-responsive fluid in accordance with a third embodiment of the present invention.

FIG. 6 is a schematic view illustrating an apparatus for controlling a flow of temperature-responsive fluid in accordance with a third embodiment of the present invention.

Referring to FIG. 6, an apparatus for controlling a flow of temperature-responsive fluid in accordance with a third embodiment of the present invention includes a housing 720, a value block 730, and a temperature-responsive device which serves to induce a pressure difference in the valve block 730 depending on a temperature change in a temperature-responsive fluid 771. The housing 720 is defined with an opening 722 to partially communicate with an outside, and is installed between an inlet 712 and an outlet 714 of a fluid pipe through which a flowing fluid flows. The valve block 730 allows inflow of the flowing fluid in the housing 720, and is installed in the housing 720 to communicate with the opening 722 of the housing 720 through a fluid discharge opening 724 so as to discharge a small amount of the flowing fluid to the outside according to a change in an internal pressure.

The apparatus for controlling a flow of temperature-responsive fluid in accordance with the third embodiment of the present invention is constructed in such a manner that, when a temperature of the temperature-responsive fluid 771 reaches a preset temperature, a pressure difference is induced in the valve block 730 by a temperature-responsive unit 774 and the flowing fluid in the valve block 730 is then discharged to the outside through the fluid discharge opening 724 which communicates with the opening 722 of the housing 700. Here, the term "preset temperature" means a temperature before the flowing fluid in the housing 720 freezes. In the present invention, every time when the temperature of the temperature-responsive fluid 771 becomes the same with the preset temperature as an outside temperature drops, a small amount of the flowing fluid is discharged to the outside to maintain of temperature of the flowing fluid in the fluid pipe 712, 714 to be equal to or higher than the preset temperature so that the fluid pipe is prevented from rupturing due to freezing of the flowing fluid.

The valve block 730 is provided with a temperature-responsive chamber 740, a pressure releasing chamber 750 and a valve chamber 760. The temperature-responsive chamber 740 includes a temperature-responsive unit 774 which is installed in the opening 722 of the housing 720 and is formed with a bellows 772 on the upper portion thereof; a holder 776 which divides the temperature-responsive unit 774 into the upper portion with the bellows 772 and a lower portion; and upper and lower communication paths 777 and 779 which are defined to communicate the upper portion and the lower portion of the temperature-responsive chamber 740 with the fluid discharge opening 724, all of which serve as the temperature-responsive device. The temperature-responsive fluid 771 is filled in the temperature-responsive unit 774. It is preferred that the temperature of the temperature-responsive fluid 771 always be lower than the temperature of the flowing fluid in the housing 720.

A first piston valve 754 is disposed in the pressure releasing chamber 750 to which a pressure is applied by the flowing fluid introduced into the housing 720, and serves to open and close a communication path 752 with the temperature-responsive chamber 740. The valve chamber 760 has an upper inlet passage 764 which allows inflow of the flowing fluid in the housing 720 with a second piston valve 762 disposed therein; a connection pipe 766 connected with the pressure releasing chamber 750; a rubber pad valve 768 installed below the upper inlet passage 764 and the connection pipe 766 to cover the fluid discharge opening 724; and a lower inlet passage 769 which is defined to communicate with the fluid discharge opening 724 when the rubber pad valve 768 is opened.

A predetermined space is defined between the upper end of the bellows 772 of the temperature-responsive unit 774 and the first piston valve 754, and the temperature-responsive unit 774 is filled with the temperature-responsive fluid 771, for example, water. The temperature-responsive fluid 771 of the present embodiment has properties to expand when temperature drops and condense when temperature rises. Accordingly, if the temperature-responsive fluid 771 expands as outside temperature drops, the bellows 772 swells to raise the first piston valve 754, and if the temperature-responsive fluid 771 condenses as an outside temperature rises, the bellows 772 contracts to lower the first piston valve 754. As such, other temperature-responsive fluids different from the above-described fluid may be filled in the temperature-responsive unit 774 so long as the other temperature-responsive fluids have properties to expand when a temperature drops and condense when a temperature rises. Also, the heat capacity of the temperature-responsive fluid 771 should be less than that of the flowing fluid in the fluid pipe. It is because that the temperature of the temperature-responsive fluid 771 in the temperature-responsive unit 774 remains lower than the temperature of the flowing fluid in the fluid pipe in the case where the same heat energy is discharged. Therefore, it is preferred that the temperature-responsive unit 774 be smaller than the fluid pipe in size.

Figure 7:
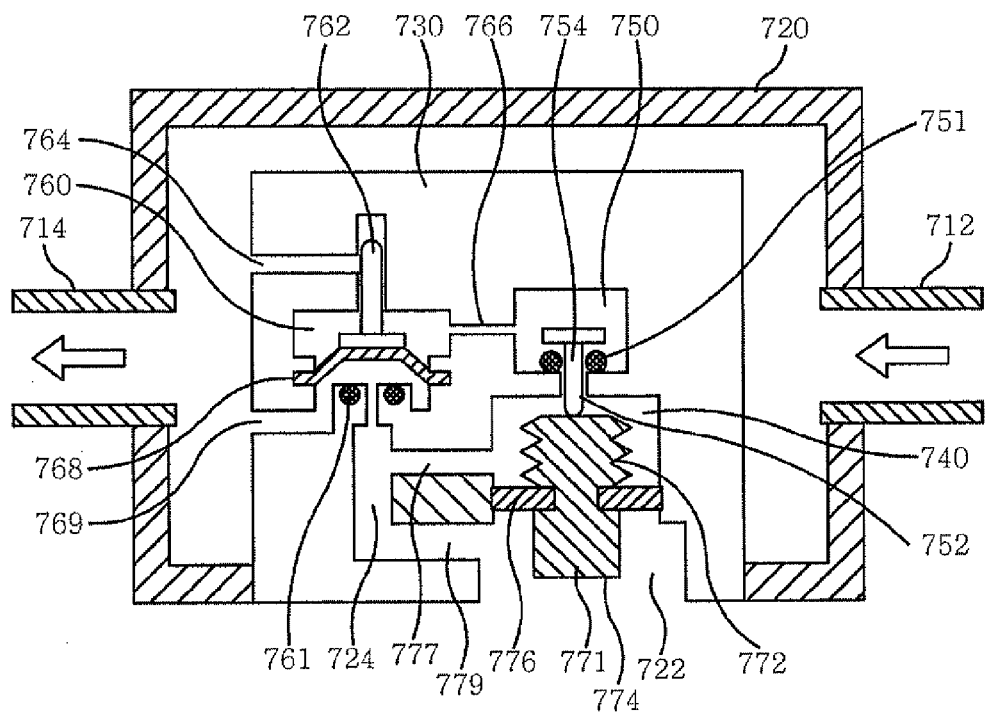
FIG. 7 is a view illustrating a state in which a temperature-responsive device is expanded when a temperature of a temperature-responsive fluid reaches a preset temperature in the apparatus for controlling a flow of temperature-responsive fluid shown in FIG. 6.

Meanwhile, when the first piston valve 754 is raised and a pressure in the pressure releasing chamber 750 is then released, the flowing fluid in the housing 720 is introduced via the upper inlet passage 764 into the valve chamber 760 which is connected with the pressure releasing chamber 750 through the connection pipe 766. However, since the second piston valve 762 is disposed in the upper inlet passage 764 with a fine gap defined therebetween, an amount of flowing fluid introduced into the valve chamber 760 through the upper inlet passage 764 is not so substantial. As a result, an amount of the flowing fluid considerably smaller than an amount of the flowing fluid moved to the pressure releasing chamber 750 through the connection pipe 766 is introduced into the valve chamber 760. Consequently, a fluid pressure in the valve chamber 760, that is, a fluid pressure on the rubber pad valve 768 is lowered. Meanwhile, underneath the rubber pad valve 768, since a fluid pressure is applied to the rubber pad valve 768 by the flowing fluid which has been introduced through the lower inlet passage 769 defined under the rubber pad valve 768, a pressure difference is induced between upper and lower sides of the rubber pad valve 768. When the pressure difference is induced in this way, the rubber pad valve 768 is raised upward, as shown in FIG. 7, and then the lower inlet passage 769 and the fluid discharge opening 724 communicate with each other. By this fact, the flowing fluid in the housing 720 is introduced into the fluid discharge opening 724 and is then discharged through the lower portion of the temperature-responsive chamber 740 which is defined to communicate with the opening 722 of the housing 720.

The second piston valve 762 is raised and lowered along the upper inlet passage 764 in a manner operatively linked with such opening and closing of the rubber pad valve 768. Accordingly, foreign substances likely to be accumulated between the wall of the upper inlet passage 764 and the second piston valve 762 can be additionally removed and therefore, the lifetime and the operational reliability of the apparatus for controlling a flow of temperature-responsive fluid of the present invention can be increased and improved. In the drawings, the unexplained reference numerals 751 and 761 respectively designate rubber rings which are disposed to provide water-tightness where the first piston valve 754 of the pressure releasing chamber 750 and the second piston valve 762 of the valve chamber 760 are opened and closed.

In the third embodiment of the present invention, while not shown in a drawing, it may be contemplated that a one-way valve is installed in the upper inlet passage 764 of the valve chamber 760 to prevent the flowing fluid introduced through the upper inlet passage 764 from flowing backward to the outside so that the reliability of the apparatus for controlling a flow of temperature-responsive fluid can be improved.

Figure 8:
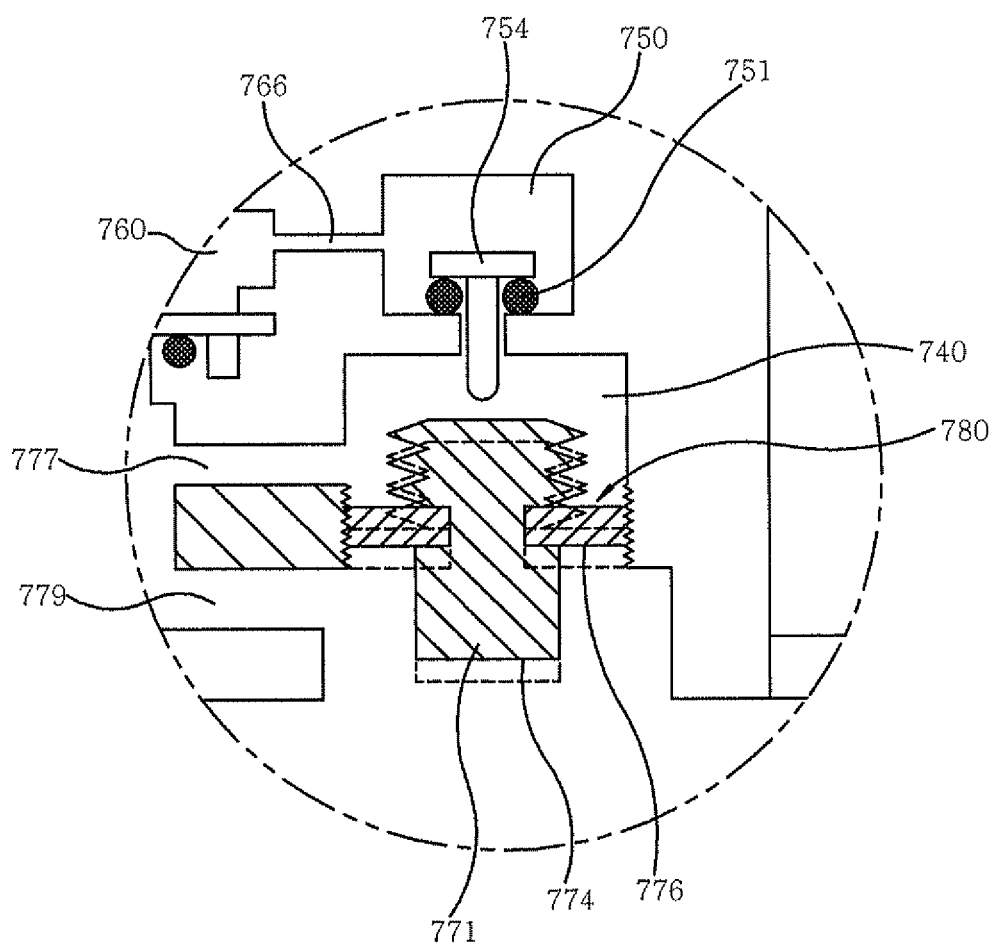
FIG. 8 is an enlarged view illustrating a holder for changing the preset temperature of the temperature-responsive fluid.

In addition, the apparatus for controlling a flow of temperature-responsive fluid according to the third embodiment of the present invention further includes a preset temperature changing device 780 to adjust the opening and closing timings of the first piston valve 754. Referring to FIG. 8, the preset temperature changing device 780 includes a holder 776 which is threadedly coupled to the inner wall of the temperature-responsive chamber 740, wherein threads formed on the circumferential outer surface of the holder 776 are coupled to the threads formed on the inner wall of the temperature-responsive chamber 740. Thus, a timing, at which the flowing fluid in the pressure releasing chamber 750 is introduced into the temperature-responsive chamber 740, can be adjusted through threading. That is to say, if a distance between the upper end of the bellows 772 and the first piston valve 754 is shortened through threading as shown by the solid line in FIG. 8, even when the temperature-responsive fluid 771 filled in the temperature-responsive unit 774 expands slightly, the first piston valve 754, which has closed the communication path 752 by the pressure of the flowing fluid, is raised. Resultantly, a time, at which the flowing fluid introduced into the pressure releasing chamber 750 is introduced into the temperature-responsive chamber 740, can be advanced. Conversely, if a distance between the upper end of the bellows 772 and the first piston valve 754 is lengthened through threading as shown by the dotted line in FIG. 8, only when the temperature-responsive fluid 771 filled in the temperature-responsive unit 774 expands more, the first piston valve 754, which has closed the communication path 752 by the pressure of the flowing fluid, is raised. Therefore, a time, at which the flowing fluid in the pressure releasing chamber 750 is introduced into the temperature-responsive chamber 740, is retarded.

Assuming that the fluid pipe is a water pipe, because a water pressure of a water pipe generally has a value of about 2-3 kgf/cm$^2$, a flow rate when a fluid is discharged to the outside becomes very fast. Therefore, since a negative pressure is induced in the fluid discharge opening 724 based on Bernoulli's theorem after the fluid is discharged and the fluid discharge opening 724 and the upper portion of the temperature-responsive chamber 740 communicate with each other by the upper communication path 777, the flowing fluid in the temperature-responsive chamber 740 flows to the fluid discharge opening 724 through the upper communication path 777 by a pressure difference between the fluid discharge opening 724 and the upper portion of the temperature-responsive chamber 740 and is discharged through the fluid discharge opening 724. Because all the fluid in the temperature-responsive chamber 740 is discharged through the fluid discharge opening 724, the upper communication path 777 is always kept clean.

Hereafter, operations of the apparatus for controlling a flow of temperature-responsive fluid in accordance with the third embodiment of the present invention, as mentioned above, will be described.

When an outside temperature is equal to or higher than a preset temperature, as shown in FIG. 6, the flowing fluid introduced into the housing 720 through the inlet 712 of the fluid pipe is filled in the valve chamber 760 and the pressure releasing chamber 750 by the pressure of the flowing fluid, the temperature-responsive fluid 771 filled in the temperature-responsive unit 774 has a certain volume, and the first piston valve 754 maintains a predetermined distance from the bellows 772 of the upper portion of the temperature-responsive unit 774 and is tightly brought into contact with the rubber ring 751 by the flowing fluid filled in the pressure releasing chamber 750 to close the communication path 752. In this state, if the outside temperature drops and the temperature of the temperature-responsive fluid 771 filled in the temperature-responsive unit 774 reaches the preset temperature that allows the flowing fluid, that is, water, in the housing 720 to be discharged before freezing, this is sensed by the temperature-responsive part 774. In other words, since the size of the temperature-responsive part 774 is smaller than the size of the fluid pipe, in a state in which the temperature of the temperature-responsive fluid 771 in the temperature-responsive part 774 is lower than the temperature of the flowing fluid in the fluid pipe, if the outside temperature drops and becomes 0° C. at which the flowing fluid freezes, the temperature-responsive fluid 771 in the temperature-responsive part 774 starts to freeze earlier than the flowing fluid. In this regard, since the density of the frozen temperature-responsive fluid 771 is smaller by about 10% than that of the flowing fluid (the volume of ice is larger by about 10% than the volume of water when assuming the same mass), the volume of the temperature-responsive fluid 771 increases as ice is produced, which leads to swell the bellows 772. As the bellows 772 swells in this way by a preselected height, the bellows 772 pushes the first piston valve 754 and the first piston valve 754 is then raised to open the communication path 752. Consequently, the flowing fluid in the pressure releasing chamber 750 flows into the temperature-responsive chamber 740 through the communication path 752 and is discharged through the fluid discharge opening 724 via the upper communication path 777. Since the pressure releasing chamber 750 communicates with the valve chamber 760 by the connection pipe 766, the flowing fluid filled in the valve chamber 760 flows into the pressure releasing chamber 750 through the connection pipe 766.

Since the second piston valve 762 is interposed in the upper inlet passage 764, flowing fluid to be introduced into the valve chamber 760 flows through a gap between the upper inlet passage 764 and the second piston valve 762. Therefore, a considerably smaller amount of flowing fluid than the amount of the flowing fluid introduced into the pressure releasing chamber 750 through the connection pipe 766 is introduced into the valve chamber 760. Therefore, the fluid pressure in the valve chamber 760, that is, the fluid pressure on the upper side of the rubber pad valve 768 becomes low. However, on the lower side of the rubber pad valve 768, since a fluid pressure is applied by the fluid introduced into the lower inlet passage 769 defined in under the rubber pad valve 768, a pressure difference is induced between the upper and lower sides of the rubber pad valve 768. Accordingly, as shown in FIG. 7, the rubber pad valve 768 is pushed upward, and the lower inlet passage 769 and the fluid discharge opening 724 communicate with each other. Consequently, the flowing fluid in the housing 720 is introduced into the lower inlet passage 769, flows to the fluid discharge opening 724, and is discharged underneath the temperature-responsive chamber 740 through the lower communication path 779.

The fluid pressure in the fluid pipe which may be a water pipe generally has a value of about 2-3 kgf/cm$^2$, a flow rate when a fluid is discharged to the outside becomes very fast. Therefore, a negative pressure is induced in the fluid discharge opening 724 according to Bernoulli's theorem after the fluid is discharged. Since the fluid discharge opening 724 and the upper portion of the temperature-responsive chamber 740 communicate with each other by the upper communication path 777, the flowing fluid in the upper portion of the temperature-responsive chamber 740 flows to the fluid discharge opening 724 through the upper communication path 777 by a pressure difference between the fluid discharge opening 724 and the upper portion of the temperature-responsive chamber 740 and is discharged through the lower communication path 779 and underneath the temperature-responsive chamber 740.

As the flowing fluid in the upper portion of the temperature-responsive chamber 740 and in the housing 720 is discharged through the fluid discharge opening 724 in this way, the flowing fluid discharged through the lower communication path 779 and underneath the temperature-responsive chamber 740 contacts the lower portion of the temperature-responsive unit 774. The temperature of the discharged flowing fluid is higher than that of the temperature-responsive fluid 771 in the temperature-responsive unit 774. By such contact between the discharged flowing fluid and the lower portion of the temperature-responsive unit 774, ice frozen in the temperature-responsive unit 774 becomes melt. Accordingly, the volume of the flowing fluid in the temperature-responsive unit 774 decreases to contract the bellows 772. As a result, the first piston valve 754 is not raised any more. Thus, the first piston valve 754 closes again the communication path 752. Also, if the pressure difference between the upper and lower sides of the rubber pad valve 768 disappears as a fluid pressure in the valve chamber 760 gradually increase, the rubber pad valve 768 returns to the original state and closes the fluid discharge opening 724, by which the discharge of the flowing fluid is interrupted.

In the apparatus for controlling a flow of temperature-responsive fluid of the present invention, by repeating the above operations, the flowing fluid can always flow through the fluid pipe. Therefore, even when an outside temperature drops, it is possible to prevent the flowing fluid in the fluid pipe from freezing, without power supply from an outside, whereby the fluid pipe is prevented from rupturing due to the freezing of the flowing fluid.

Figure 9:
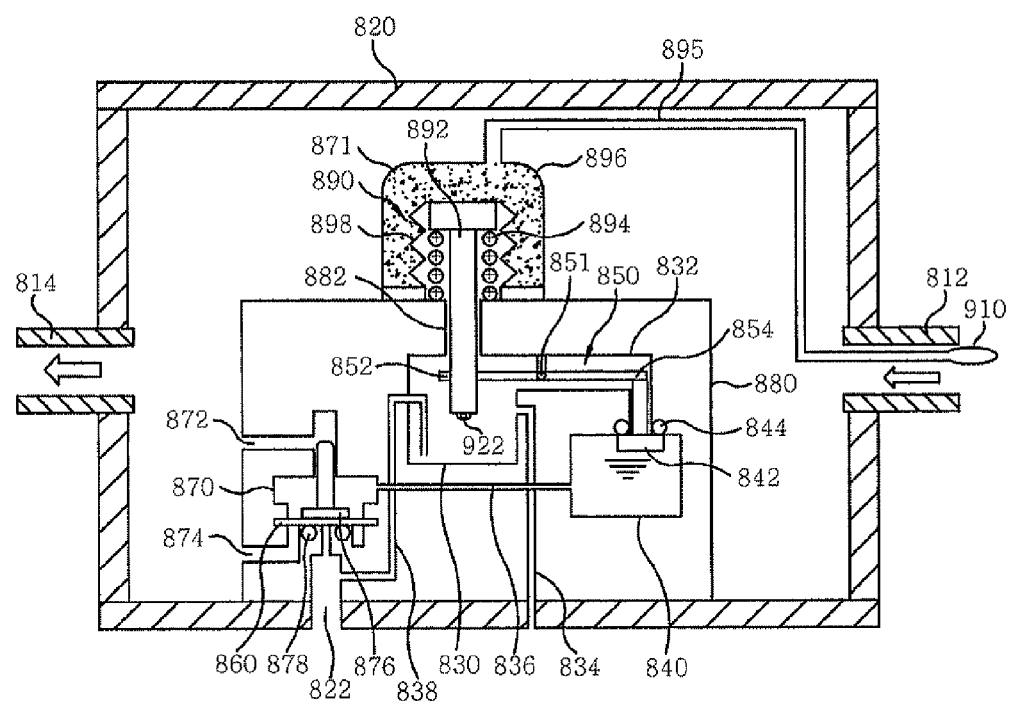
FIG. 9 is a schematic view illustrating an apparatus for controlling a flow of temperature-responsive fluid in accordance with a fourth embodiment of the present invention.
Figure 10:
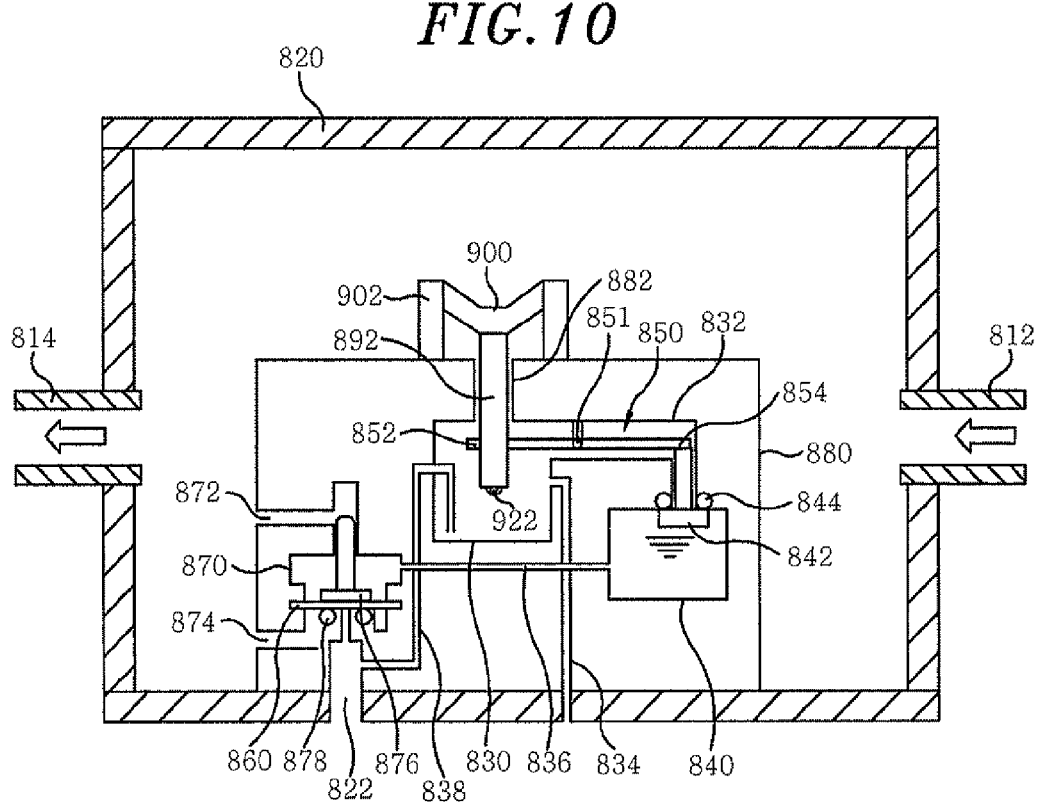
FIG. 10 is a schematic view illustrating a modified example of a temperature-responsive device in the apparatus for controlling a flow of temperature-responsive fluid shown in FIG. 9.
Figure 11:
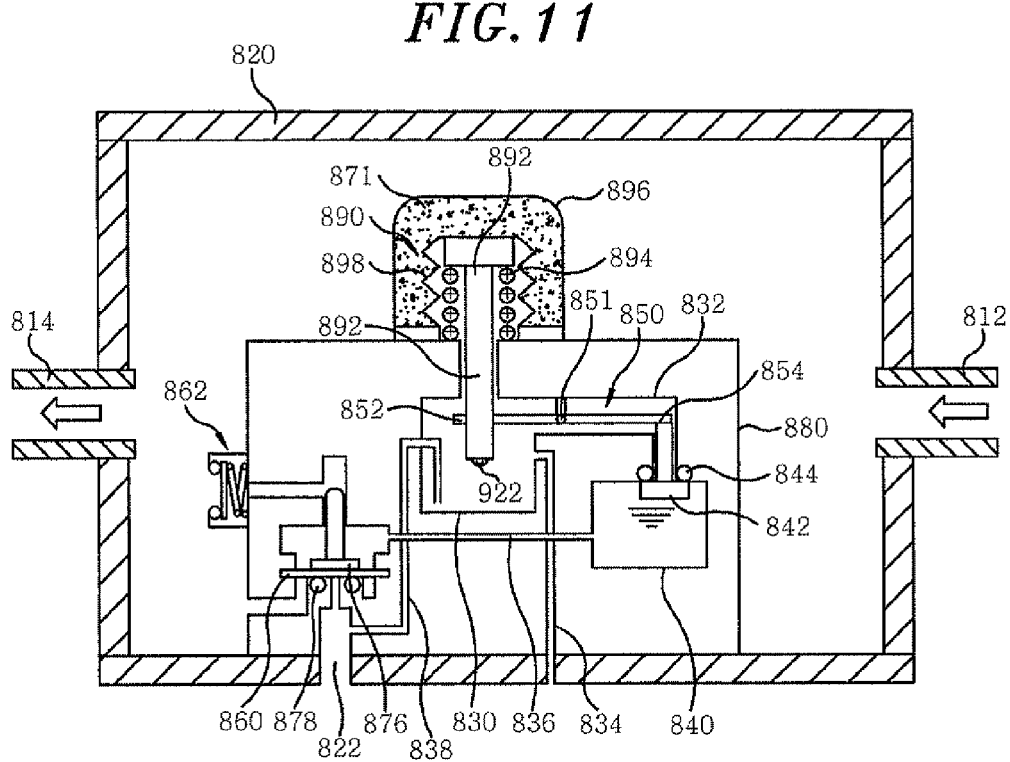
FIG. 11 is a view illustrating a one-way valve disposed in an upper inlet passage shown in FIG. 9.
Figure 12:
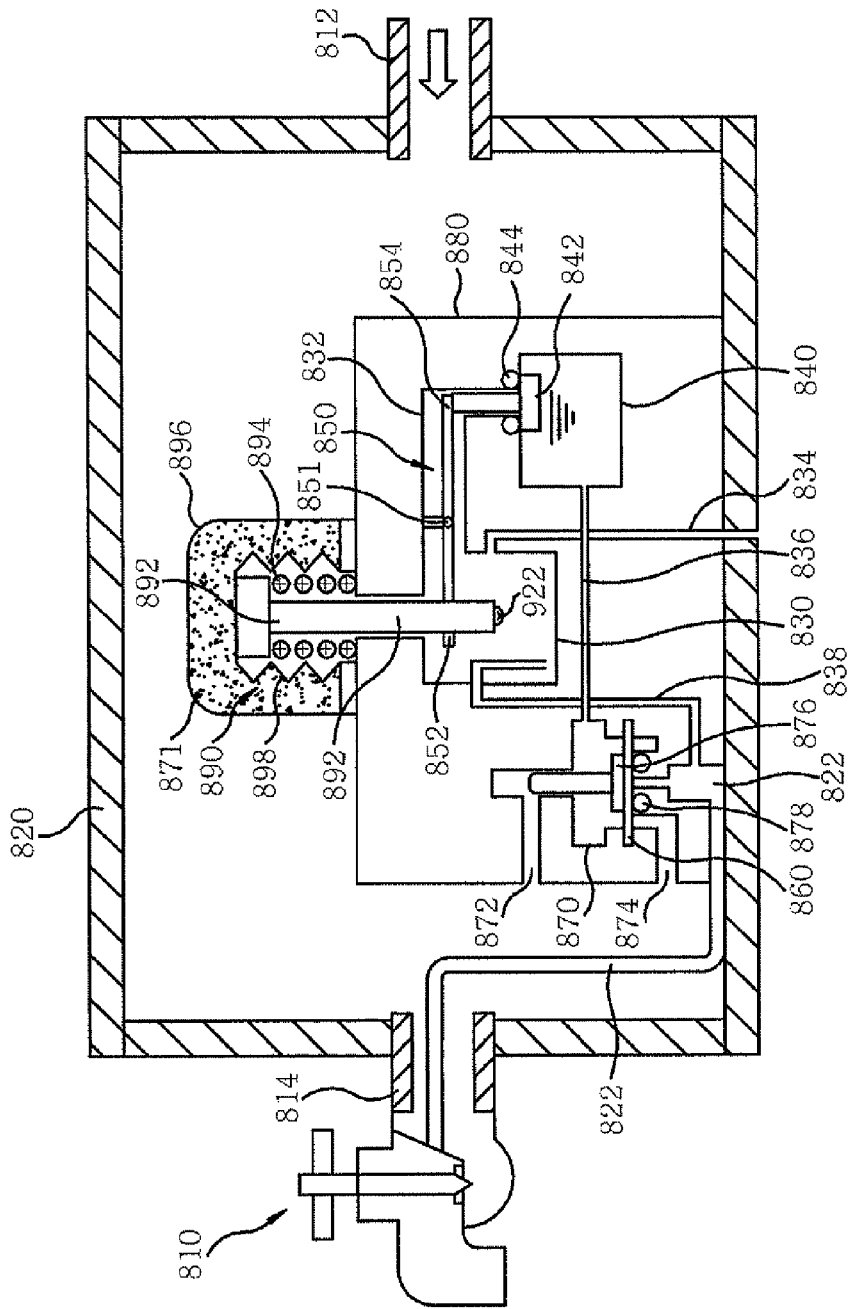
FIG. 12 is a view illustrating a fluid discharge opening communicated with a fluid pipe.
Figure 13:
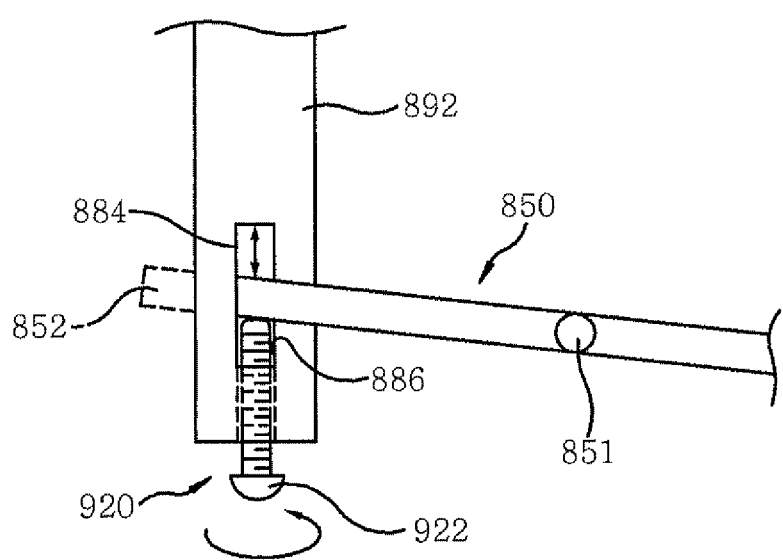
FIG. 13 is a schematic view illustrating the construction of a preset temperature changing device added to the apparatus for controlling a flow of temperature-responsive fluid shown in FIG. 9.

FIG. 9 is a schematic view illustrating an apparatus for controlling a flow of temperature-responsive fluid in accordance with a fourth embodiment of the present invention; FIG. 10 is a schematic view illustrating a modified example of a temperature-responsive device in the apparatus for controlling a flow of temperature-responsive fluid shown in FIG. 9, in which a deformable member is coupled to a shaft such that the shaft can be raised and lowered according to a temperature change; FIG. 11 is a view illustrating a one-way valve in an upper inlet passage shown in FIG. 9; FIG. 12 is a view illustrating a state in which a fluid discharge opening communicates with a faucet; and FIG. 13 is a schematic view illustrating a preset temperature changing device added to the apparatus for controlling a flow of temperature-responsive fluid shown in FIG. 9.

Referring to FIG. 9, an apparatus for controlling a flow of temperature-responsive fluid in accordance with a fourth embodiment of the present invention includes a housing 820, a value block 880, and a temperature-responsive device 890. The housing 820 is installed between an inlet 812 and an outlet 814 of a fluid pipe through which a fluid flows. The valve block 880 allows inflow of the flowing fluid in the housing 820, and is installed in the housing 820 and is defined with a communication path 882 to discharge a small amount of the flowing fluid through a fluid discharge opening 822 to an outside of the housing 820 depending on a change in an internal pressure. The temperature-responsive device 890 is installed in and over the communication path 882 of the valve block 880 to increase and decrease a pressure in the valve block 880 according to a temperature change of the flowing fluid in the housing 820.

The apparatus for controlling a flow of temperature-responsive fluid in accordance with the fourth embodiment of the present invention is constructed in such a manner that, if the temperature of the flowing fluid in the housing 820 reaches a preset temperature, a pressure in the valve block 880 increases due to contraction of the temperature-responsive device 890 and the flowing fluid in the valve block 880 is discharged to the outside of the housing 820 through the fluid discharge opening 822. Here, the preset temperature means a temperature before the flowing fluid in the housing 820 freezes. In the present invention, whenever the temperature of the flowing fluid in the housing 820 becomes the same with the preset temperature as temperature drops, a small amount of the flowing fluid is discharged to the outside to maintain the temperature of the flowing fluid 812, 814 in the fluid pipe to be equal to or higher than the preset temperature so that the fluid pipe is prevented from rupturing due to freezing of the flowing fluid.

The valve block 880 includes a fluid storage tank 830 which communicates with the communication path 882; a pressure releasing chamber 840 which communicates with the fluid storage tank 830 through a communicating portion 832; a seesaw member 850 hinged to the communicating portion 832; and a valve chamber 870 connected to the pressure releasing chamber 840 through a connection pipe 836. The flowing fluid in the housing 820 is introduced into the valve block 880 through an upper inlet passage 872 defined over the valve chamber 870, and is filled in the valve chamber 870, the connection pipe 836 and the pressure releasing chamber 840.

A first piston valve 842 is disposed in the pressure releasing chamber 840 to open and close the communicating portion 832. In order to open and close the communicating portion 832, the seesaw member 850 has one end 852 linked with contraction and swell of the temperature-responsive device 890 and the other end 854 linked with opening and closing of the first piston valve 842 in the pressure releasing chamber 840.

The temperature-responsive device 890 includes a shaft 892 installed to be raised and lowered through the communication path 882 in the valve block 880; a pressure compensation spring 894 biasing the shaft 892 in one direction; a gas storage chamber 896 storing a gas as a temperature-responsive fluid 871 capable of condensing and expanding according to a temperature change; and a bellows 898 coupled to the shaft 892 to allow the shaft 892 to be raised and lowered according to the condensation and expansion of the temperature-responsive fluid 871. It is preferred that the bellows 898 be installed in an airtight manner so that the gas stored in the gas storage chamber 896 does not leaks into the communication path 882.

While the present invention is described to be responsive to a temperature of the flowing fluid in the housing 820, it is conceivable to control the flow of the fluid in response to a temperature of an outside remote site. In this case, the gas 871 stored in the gas storage chamber 896 is supplied through a gas connection pipe 895 from a temperature-responsive fluid source 910 positioned at the remote site. In the embodiment of the present invention, all gases which changes in a pressure depending on to a temperature can be theoretically used as the gas stored in the gas storage chamber 896. It is preferred that a gas is in a saturated state within an available temperature range (a coexistence state of fluid and gas). Such a gas may include a Freon-based or non-Freon-based refrigerant gas which is generally used in a refrigerator or the like.

If a temperature outside the fluid pipe 812, 814 drops and a temperature of the flowing fluid in the housing 820 reaches a preset temperature, the temperature-responsive fluid 871 filled in the gas storage chamber 896 condenses. Accordingly, as the pressure compensating spring 894 is uncompressed and the bellows 898 swells, one ends of the shaft 892 and the seesaw member 850 are raised about a hinge shaft 851. On the contrary, the other end of the seesaw member 854 is lowered about the hinge shaft 851 to press the first piston valve 842 which has closed the communicating portion 832 by the pressure of the flowing fluid. According to this fact, as the communicating portion 832 is opened, the flowing fluid filled in the pressure releasing chamber 840 is introduced into and stored in the fluid storage tank 830 through the communicating portion 832.

Conversely, if a temperature outside the fluid pipe rises and the temperature of the flowing fluid in the housing 820 becomes higher than the preset temperature, the temperature-responsive fluid 871 filled in the gas storage chamber 896 expands. Accordingly, as the pressure compensating spring 894 is compressed and the bellows 898 contracts, the one ends of the shaft 892 and the seesaw member 850 are lowered about a hinge shaft 851 and the other end of the seesaw member 854 is raised about the hinge shaft 851. According to this fact, the first piston valve 842 in the opening position is raised by the pressure of the flowing fluid and closes the communicating portion 832. Thus, the flowing fluid filled in the pressure releasing chamber 840 is prevented from being introduced into the fluid storage tank 830 through the communicating portion 832.

FIG. 10 illustrates a modified example of the temperature-responsive device in which the gas is used as the temperature-responsive fluid. Referring to FIG. 10, the temperature-responsive device 890 includes a deformable member 900 which can be deformed depending on a temperature change and is coupled to the shaft 892 and support members 902 such that the shaft 892 can be raised and lowered. The temperature-responsive device 890 according to this example operates similarly to the temperature-responsive device 890 shown in FIG. 9 and, therefore, detailed description thereof will be omitted herein. The deformable member 900 may include, for example, a bimetal, a shape memory alloy, or a material with a substantial heat expansion coefficient.

Further, in FIG. 10, the shaft 892 and the first piston valve 842 are shown to be linked with each other by the seesaw member 850. However, while not shown in a drawing, alternatively, it may be contemplated in the present variation that the shaft 892 and the first piston valve 842 are linked with each other without using the seesaw member 850 since the contraction and swell of the deformable member 900 can be directly converted into upward and downward motions.

Referring back to FIG. 9, the upper inlet passage 872, in which a second piston valve 876 is disposed, communicates with the valve chamber 870. The valve chamber 870 is connected with the pressure releasing chamber 840 via the connection pipe 836. In the valve chamber 870, a rubber pad valve 860 is installed to open and close the fluid discharge opening 822. A lower inlet passage 858 is defined to communicate with the fluid discharge opening 822 when the rubber pad valve 860 is opened. While the flowing fluid in the housing 820 is introduced into the valve chamber 870 through the upper inlet passage 872, the second piston valve 876 is disposed in the upper inlet passage 872 with a fine gap defined therebetween. Therefore, an amount of flowing fluid introduced into the valve chamber 870 through the upper inlet passage 872 is not so substantial. In this regard, it is preferred that the second piston valve 876 be raised and lowered by being linked with opening and closing of the rubber pad valve 860. As the second piston valve 876 is raised and lowered by being linked with opening and closing of the rubber pad valve 860 in this way, foreign substances likely to be accumulated between the wall of the upper inlet passage 872 and the second piston valve 876 can be removed, whereby the lifetime and operational reliability of the apparatus for controlling a flow of temperature-responsive fluid according to the embodiment of the present invention can be increased and improved. In the drawings, the unexplained reference numerals 844 and 878 respectively designate rubber rings which are disposed to provide water-tightness where the first piston valve 842 of the pressure releasing chamber 840 and the second piston valve 876 of the valve chamber 870 are opened and closed.

Referring to FIG. 11, a one-way valve 862 is provided in the upper inlet passage 872 of the valve chamber 870 to prevent the flowing fluid introduced through the upper inlet passage 872 from flowing backward and being discharged to the outside. Such a one-way valve 862 includes a valve element and a spring for supporting the valve element. The spring has a low elastic modulus such that the flowing fluid in the housing 820 is introduced into the valve chamber 870 through the upper inlet passage 872 and the flowing fluid in the valve chamber 870 is prevented from flowing backward to improve the reliability of the apparatus.

Referring to FIG. 12, it may be contemplated that the fluid discharge opening 822 does not communicate with the outside of the housing 820 and is connected to a faucet 810 which is provided to the inlet 812 or the outlet 814 of the fluid pipe.

Meanwhile, the apparatus for controlling a flow of temperature-responsive fluid in accordance with the embodiments of the present invention may change the preset temperature under which the flowing fluid in the housing 820 is discharged. The simplest way is to employ pressure compensation springs 894 with different elastic moduli. However, in the case where the pressure compensation spring 894 with a predetermined elastic modulus is already installed, the apparatus for controlling a flow of temperature-responsive fluid in accordance with the embodiments of the present invention may further include a preset temperature changing device 920.

Referring to FIG. 13, the preset temperature changing device 920 may include a adjustment screw 922 threaded into a threaded hole 886 which is defined in the lower end of the shaft 892. The adjustment screw 922 serves to adjust the slope of the seesaw member 850 in the valve block 880 which is coupled to the lower end of the shaft 892 of the temperature-responsive device 890, wherein the one end 852 of the seesaw member 850 is inserted through a guide hole 884 which is defined in the lower end of the shaft 892.

By threading the adjustment screw 922, the one end of the seesaw member 850 inserted through the guide hole 884 of the shaft 892 is raised and lowered while being guided in the guide hole 884. Therefore, the seesaw member 850 can be adjusted in the slope thereof about the hinge shaft 851. According to this structure, if the adjustment screw 922 is threaded such that the one end 852 of the seesaw member 850 is sloped more to be raised, the other end 854 of the seesaw member 850 is lowered further. Accordingly, even when the outside of the fluid pipe becomes slightly cold and the temperature of the flowing fluid in the housing 820 only slightly drops, a raising time of the shaft 892 is advanced. Hence, an opening time of the first piston valve 842, which has closed the communicating portion 832 by the pressure of the flowing fluid, is advanced. Conversely, if the adjustment screws 922 are threaded such that the slope of the seesaw member 850 decreases, the opening time of the first piston valve 842 is retarded.

The fluid storage tank 830 communicates with the outside through the air passage 834 which communicates with the outside and communicates with the fluid discharge opening 822 through a discharge passage 838. If a negative pressure is generated from the fluid discharge opening 822, the flowing fluid in the fluid storage tank 830 is introduced into the fluid discharge opening 822 through the discharge passage 838 and is discharged. When the flowing fluid is completely discharged from the fluid storage tank 830, outside air is introduced through the air passage 834 and then flows to the fluid discharge opening 822 through the discharge passage 838. Therefore, since even the flowing fluid remaining in the discharge passage 838 is all discharged, the discharge passage 838 is always kept clean.

Hereafter, operations of the apparatus for controlling a flow of temperature-responsive fluid in accordance with the fourth embodiment of the present invention, as mentioned above, will be described with reference to FIGS. 14 to 17.

Figure 14:
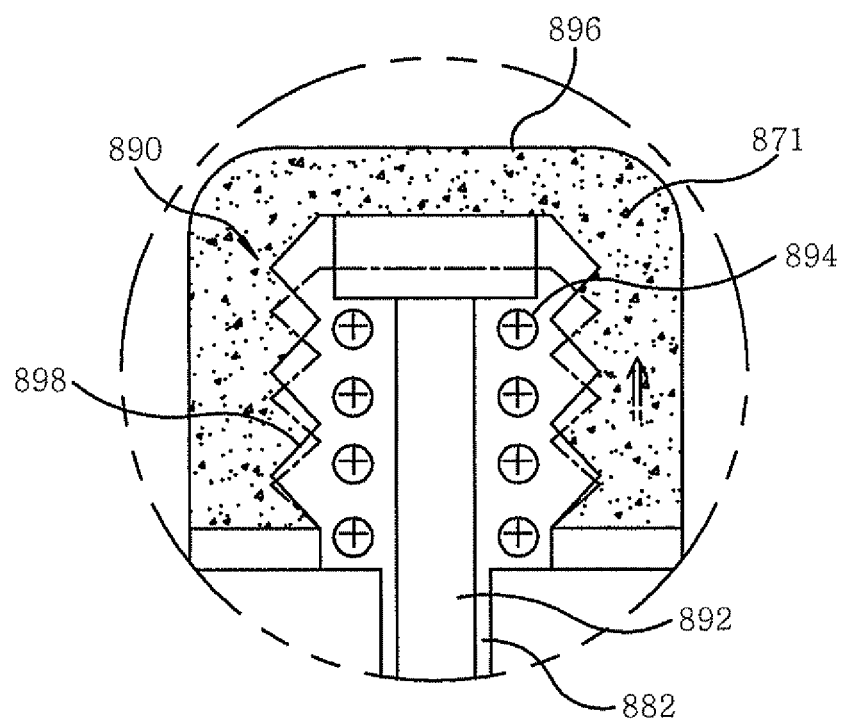
FIG. 14 is a view illustrating a state in which a bellows contracts when a temperature of a flowing fluid in a housing reaches a preset temperature in the apparatus for controlling a flow of temperature-responsive fluid shown in FIG. 9.
Figure 15:
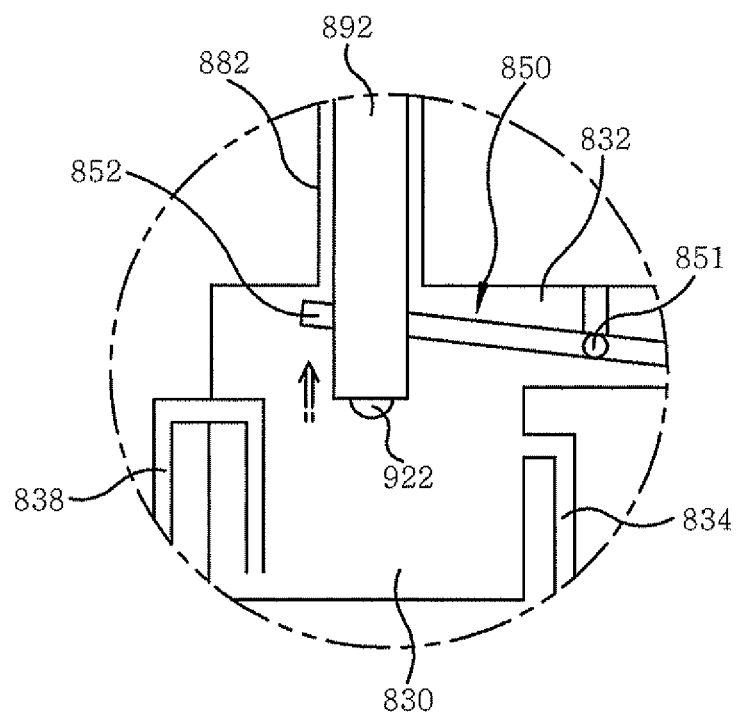
FIG. 15 is a view illustrating a state in which a fluid in a pressure releasing chamber is conveyed to a fluid storage tank, following the contraction of the bellows shown in FIG. 14.
Figure 16:
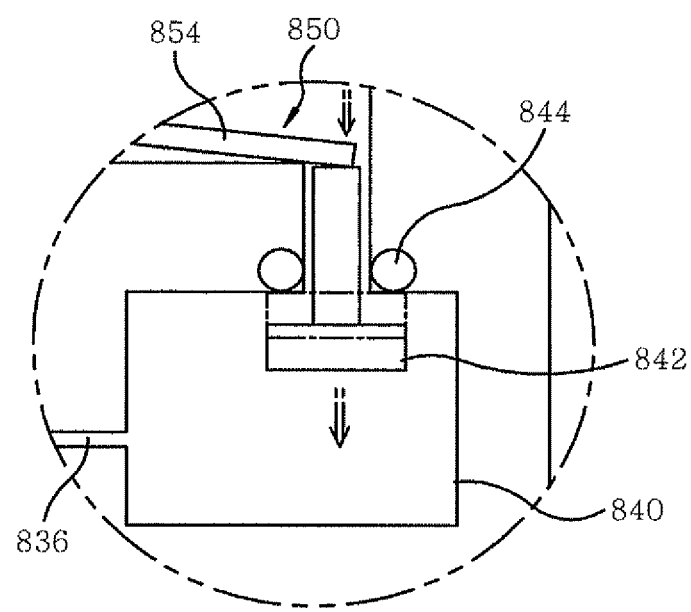
FIG. 16 is a view illustrating a state in which a fluid in a valve chamber is conveyed to the pressure releasing chamber, following the conveyance of the fluid in the pressure releasing chamber to the fluid storage tank shown in FIG. 15.

Fluid in the housing 820 is filled in the valve chamber 870 and the pressure releasing chamber 840 by the pressure of the fluid. With the apparatus of FIG. 9 being in this state, if an outside temperature drops and the temperature of the flowing fluid in the housing 820 reaches the preset temperature, this situation is sensed by the temperature-responsive device 890. That is to say, as the gas 871 in the gas storage chamber 896 condenses, the pressure compensation spring 894 is uncompressed and the bellows 898 swells as shown in FIG. 14, and at the same time, the one ends of the shaft 892 and the seesaw member 850 are raised as shown in FIG. 15. On the contrary, the other end of the seesaw member 850 is lowered about the hinge shaft 851 and presses the first piston valve 842 which has closed the communicating portion 832 by the pressure of the flowing fluid to be introduced into the pressure releasing chamber 840. As a consequence, the first piston valve 842 is lowered as shown in FIG. 16 and opens the communicating portion 832. Then, as the first piston valve 842 is lowered, since the pressure releasing chamber 840 communicates with the fluid storage tank 830 through the communicating portion 832, the fluid in the pressure releasing chamber 840 is conveyed to the fluid storage tank 830. At the same time, the fluid in the valve chamber 870 is conveyed to the pressure releasing chamber 840 through the connection pipe 836.

Figure 17:
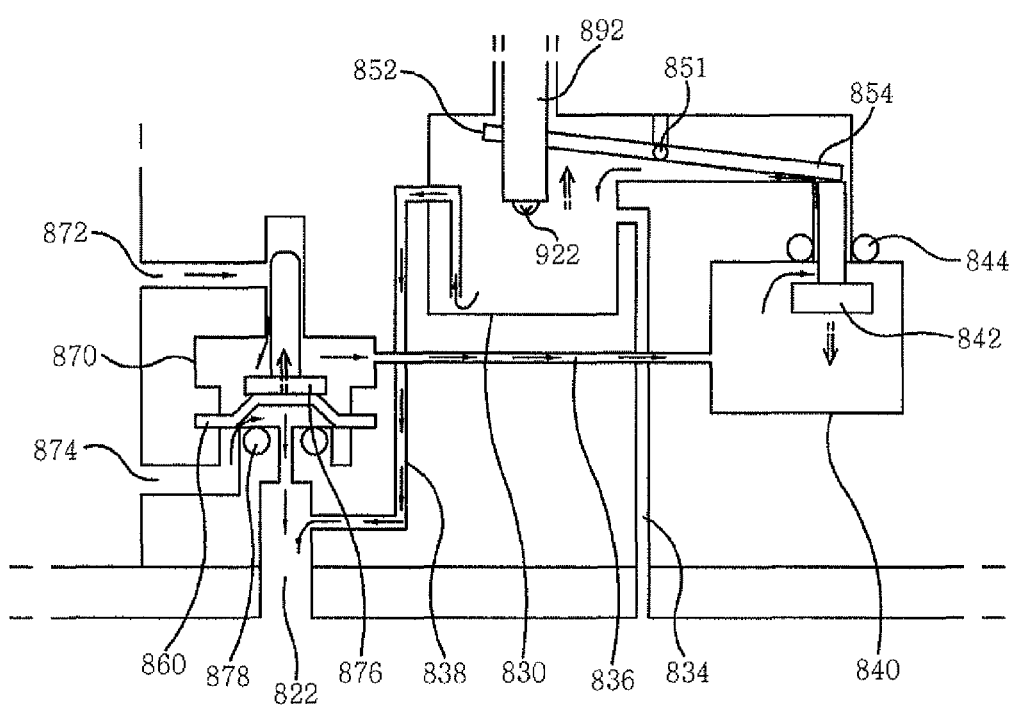
FIG. 17 is a view illustrating a state in which a flowing fluid in the fluid storage tank is discharged through the fluid discharge opening, following the conveyance of the fluid in the valve chamber to the pressure releasing chamber shown in FIG. 16.

Since the second piston valve 876 is interposed in the upper inlet passage 872, flowing fluid to be introduced into the valve chamber 870 flows through a gap between the upper inlet passage 872 and the second piston valve 876. Therefore, a considerably smaller amount of flowing fluid than the amount of the flowing fluid introduced into the pressure releasing chamber 870 through the connection pipe 836 is introduced into the valve chamber 870. According to this fact, the fluid pressure in the valve chamber 870, that is, the fluid pressure on the upper side of the rubber pad valve 860 becomes low. However, on the lower side of the rubber pad valve 860, since a fluid pressure is applied by the fluid introduced into the lower inlet passage 874 defined in under the rubber pad valve 860, a pressure difference is induced between the upper and lower sides of the rubber pad valve 860. Accordingly, as shown in FIG. 17, the rubber pad valve 860 is pushed upward, and the lower inlet passage 874 and the fluid discharge opening 822 communicate with each other. Due to this fact, the flowing fluid in the housing 820 is introduced into the lower inlet passage 874 and is discharged to the outside through the fluid discharge opening 822.

Assuming that the fluid pipe is a water pipe, because a water pressure of a water pipe generally has a value of about 2-3 kgf/cm$^2$, a flow rate when the flowing fluid is discharged to the outside becomes very fast. Therefore, a negative pressure is induced in the fluid discharge opening 822 according to Bernoulli's theorem after the fluid is discharged. Since the fluid discharge opening 822 and the fluid storage tank 830 communicate with each other by the discharge passage 838, the flowing fluid in the fluid storage tank 830 flows to the fluid discharge opening 822 due to the pressure difference between the fluid discharge opening 822 and the fluid storage tank 830 and is discharged to the outside through the fluid discharge opening 822. If all the fluid in the fluid storage tank 830 is discharged through the fluid discharge opening 822, since the fluid storage tank 830 communicates with the outside air by the communication passage 838, the outside air flows to the fluid discharge opening 822 through the air passage 834. Since even the flowing fluid remaining in the discharge passage 838 is all discharged due to the air flow, the discharge passage 838 is always kept clean.

If an outside temperature rises, flowing fluid is sufficiently introduced into the pressure releasing chamber 840 or the swelled bellows 898 contracts by the elasticity of the pressure compensation spring 894 in the bellows 898, the first piston valve 842 gradually closes the communicating portion 832. Accordingly, the fluid pressure of the valve chamber 870 gradually rises and becomes equal to the pressure under the rubber pad valve 860 so that there is no pressure difference.

By this fact, the rubber pad valve 860 returns to the original state and prevents the communication between the lower inlet passage 874 and the fluid discharge opening 822, by which the discharge of the flowing fluid is interrupted.

In the apparatus for controlling a flow of temperature-responsive fluid according to the embodiment of the present invention, by repeating the above operations, the flowing fluid can always flow through the fluid pipe. Therefore, even when an outside temperature drops, it is possible to prevent the flowing fluid in the fluid pipe from freezing, without power supply from an outside, whereby the fluid pipe is prevented from rupturing due to the freezing of the flowing fluid.

While the invention has been shown and described with respect to the preferred embodiments of the apparatus for controlling a flow of temperature-responsive fluid, it is explanatory only, and is not restricted thereto and it is intended to construct broadly in accordance with aspects as claimed. The structure and the arrangement of the components may be variously modified without departing from the scope of the invention. It should be understood by those skilled in the art that the present invention can be variously modified. These modifications are also included in the scope of the invention defined in the appended claims.

What is claimed is:

1. An apparatus for controlling a flow of temperature-responsive fluid, comprising:
    a housing installed between an inlet and an outlet of a fluid pipe in which a flowing fluid flows, the housing having an opening which communicates with an outside, and the opening is separate from the outlet of the fluid pipe; and
    a valve block installed in the housing configured to allow inflow of the flowing fluid in the housing and to discharge a portion of the flowing fluid to the outside through the opening depending on a change in an internal pressure of the valve block; and
    a temperature-responsive device installed in the housing configured to generate a pressure difference in the valve block depending on a change in a temperature of a temperature-responsive fluid filled therein.

2. The apparatus of claim 1, wherein the temperature-responsive device comprises a temperature-responsive unit which is filled with the temperature-responsive fluid and is installed on the valve block,
    wherein the valve block comprises a reaction chamber which is disposed inside of the valve block to communicate with the temperature-responsive unit; a valve chamber which is disposed inside of the valve block to allow inflow of the flowing fluid introduced into the housing; a discharge pipe which communicates with the opening; a first fluid path which communicates the reaction chamber and the valve chamber with each other; and a second fluid path which communicates the reaction chamber and the discharge pipe with each other, and
    wherein, when the temperature-responsive fluid reaches a preset temperature, the flowing fluid, which is introduced into the valve chamber, is introduced into the reaction chamber through an operation of the temperature-responsive unit, and the flowing fluid in the housing, which is to be introduced into the valve chamber, is discharged through the discharge pipe by a pressure difference induced in the valve chamber.

3. The apparatus of claim 2, wherein the temperature-responsive unit comprises:
    a bellows installed to swell and contract according to expansion and condensation of the temperature-responsive fluid;
    a piston member installed in the bellows to be raised and lowered by swell and contraction of the bellows; and
    a spring wound on an outer surface of the piston member to bias the piston member.

4. The apparatus of claim 3, wherein the reaction chamber comprises a first valve body installed to be raised and lowered according to the piston member raised and lowered to thereby open and close the first fluid path, the first valve body including a hollow member, an elastic rubber member inserted into a lower end of the hollow member, and a spring and a contact member sequentially inserted into an upper end of the hollow member, and
    wherein the contact member elastically contacts a lower end of the piston member, and the second fluid path is opened and closed according to the first valve body raised and lowered.

5. The apparatus of claim 2, wherein the valve chamber comprises:
    an upper inlet passage having disposed therein a piston valve and allowing inflow of the flowing fluid in the housing;
    a rubber pad valve installed to open and close the discharge pipe; and
    a lower inlet passage defined to communicate with the discharge pipe when the rubber pad valve is opened.

6. The apparatus of claim 2, wherein the temperature-responsive fluid comprise a fluid which condenses when a temperature drops and expands when a temperature rises.

7. The apparatus of claim 2, wherein the discharge pipe includes a fluid discharge chamber which has a second valve body installed to open and close the discharge pipe, the second valve body including a hollow member, a spring having one end inserted into a lower end of the hollow member and the other end attached to the opening of the housing to bias the hollow member upward, and an elastic rubber member inserted into an upper end of the hollow member.

8. The apparatus of claim 2, wherein the second fluid path includes a fluid discharge amount adjustor which has a fluid storage chamber and a second valve chamber communicating with the fluid storage chamber; and wherein the discharge pipe has a center portion formed like an orifice tube; an upper end communicating with the second valve chamber; and a lower end communicating the fluid storage chamber.

9. The apparatus of claim 8, wherein the fluid storage chamber has a valve member installed to open and close the second fluid path; a spring installed to bias the valve member downward; and a third fluid path communicating with the lower end of the discharge pipe, and
    wherein, when the valve member is raised as a predetermined pressure is produced in the reaction chamber due to the flowing fluid, the flowing fluid in the reaction chamber is introduced into the fluid storage chamber through the second fluid path or discharged via the third fluid path through the lower end of the discharge pipe.

10. The apparatus of claim 8, wherein the second valve chamber includes a piston valve disposed in a communication path communicating with the fluid storage chamber; and a rubber pad valve installed to open and close the second fluid path.

11. The apparatus of claim 1, wherein the temperature-responsive device comprises a temperature-responsive unit, temperature-responsive unit being filled with the temperature-responsive fluid, and being formed with a bellows such that a temperature of the temperature-responsive fluid becomes lower than a temperature of the flowing fluid in the housing to induce a pressure difference in the valve block depending on a temperature change in the temperature-responsive fluid filled.

12. The apparatus of claim 11, wherein the valve block comprises:
a temperature-responsive chamber having installed therein the temperature-responsive unit and including a holder which supports the temperature-responsive unit and divides the temperature-responsive unit into an upper portion with the bellows and a lower portion, and upper and lower communication paths which are defined to communicate an upper portion and a lower portion of the temperature-responsive chamber with a fluid discharge opening;
a pressure releasing chamber having a first piston valve installed to open and close a communication path communicating with the temperature-responsive chamber and applied with a pressure by the flowing fluid introduced into the housing; and
a valve chamber having an upper inlet passage which has disposed therein a second piston valve and allows inflow of the flowing fluid in the housing, a connection pipe which is connected with the pressure releasing chamber, a rubber pad valve which is installed below the upper inlet passage and the connection pipe to cover the fluid discharge opening, and a lower inlet passage which is defined to communicate with the fluid discharge opening when the rubber pad valve is opened.

13. The apparatus of claim 11, wherein a size of the temperature-responsive unit is determined to be smaller than that the fluid pipe so that a temperature of the temperature-responsive fluid is kept lower than a temperature of the flowing fluid.

14. The apparatus of claim 12, further comprising: a preset temperature changing device capable of changing the preset temperature.

15. The apparatus of claim 14, wherein the preset temperature changing device comprises the holder, the holder being threadedly coupled to an inner wall of the temperature-responsive chamber.

16. The apparatus of claim 11, wherein the temperature-responsive fluid comprise a fluid which expands when a temperature drops and condenses when a temperature rises.

17. The apparatus of claim 1, wherein the valve block comprises:
a communication path formed to discharge the flowing fluid to an outside of the housing through the opening;
a fluid storage tank communicating with the communication path to store the flowing fluid introduced into the housing;
a pressure releasing chamber filled with the flowing fluid introduced into the housing and having a first piston valve which is installed to open and close a communicating portion communicating with the fluid storage tank;
a seesaw member hinged to the communicating portion and having one end linked with swell and contraction of the temperature-responsive unit and the other end linked with opening and closing of the first piston valve; and
a valve chamber having an upper inlet passage which has disposed therein a second piston valve and allows inflow of the flowing fluid in the housing, a connection pipe which is connected with the pressure releasing chamber, a rubber pad valve installed below the upper inlet passage and the connection pipe to cover the opening, and a lower inlet passage defined to communicate with the opening when the rubber pad valve is opened.

18. The apparatus of claim 17, wherein the temperature-responsive device comprises:
a shaft installed in the communication path to be raised and lowered through the communication path;
a pressure compensating spring for biasing the shaft in one direction;
a gas storage chamber for storing a gas which expands and condenses according to a temperature change; and
a bellows coupled to the shaft such that the shaft is raised and lowered according to expansion and condensation of the gas.

19. The apparatus of claim 17, wherein the temperature-responsive device comprises:
a shaft installed in the communication path to be raised and lowered through the communication path, and
a deformable member coupled to the shaft such that the shaft is raised and lowered according to a temperature change.

20. The apparatus of claim 19, wherein the deformable member includes any one of a bimetal, a shape memory alloy, and a material with a substantial heat expansion coefficient.

21. The apparatus of claim 17, wherein the temperature-responsive fluid comprise a fluid which condenses when a temperature drops and expands when a temperature rises.

22. The temperature-responsive fluid flow control apparatus of claim 18, further comprising:
a preset temperature changing device capable of changing the preset temperature.

23. The apparatus of claim 22, wherein the preset temperature changing device comprises an adjustment screw coupled to a lower end of the shaft of the temperature-responsive unit to adjust a slope of the seesaw member of the valve block.

24. The apparatus of claim 17, wherein the fluid storage tank has an air passage which communicates with an outside air and a discharge passage which communicates with the opening, and
wherein the flowing fluid stored in the fluid storage tank is introduced into the opening through the discharge passage by a negative pressure
produced in the opening and is discharged.

* * * * *